United States Patent
Sahramaa

[11] Patent Number: 6,088,988
[45] Date of Patent: Jul. 18, 2000

[54] CHORD WITH INWARDLY DEPENDING ENDS AND RIDGE CONNECTION SYSTEM

[76] Inventor: Kimmo J. Sahramaa, 11301 S. Shore Rd., Reston, Va. 22090

[21] Appl. No.: 09/179,402

[22] Filed: Oct. 27, 1998

[51] Int. Cl.[7] ........................................................ E04B 1/08
[52] U.S. Cl. ............................... 52/639; 52/712; 52/715; 52/90.1; 52/731.7; 403/402
[58] Field of Search .................................... 403/401, 402, 403/231; 52/712, 715, 639, 90.1, 731.7, 737.6

[56] References Cited

U.S. PATENT DOCUMENTS

| | | | |
|---|---|---|---|
| 2,931,129 | 4/1960 | Boniface | 403/231 X |
| 3,184,800 | 5/1965 | Nelson | 403/402 X |
| 4,986,051 | 1/1991 | Meyer et al. | 52/731.7 X |
| 5,109,646 | 5/1992 | Colonias et al. | 403/402 X |
| 5,457,927 | 10/1995 | Pellock et al. | 52/731.7 X |
| 5,524,397 | 6/1996 | Byers et al. | 52/715 X |
| 5,737,882 | 4/1998 | Eckert et al. | 52/712 X |
| 5,865,008 | 2/1999 | Larson | 52/639 X |
| 5,927,041 | 7/1999 | Sedlmeier et al. | 52/731.7 X |

*Primary Examiner*—Carl D. Friedman
*Assistant Examiner*—Phi Dieu Tran A
*Attorney, Agent, or Firm*—A. David Pellinen

[57] ABSTRACT

A top chord profile of a roof truss chord has inwardly depending ends at the mouth area of the chord and trapezoidal flanges resulting in stronger chords. The chord profiles can be connected to each other at mitered ends using a connecting plate at a ridge in a manner that allows absorption of the compressive forces at the ridge.

8 Claims, 4 Drawing Sheets

6,088,988

CHORD WITH INWARDLY DEPENDING ENDS AND RIDGE CONNECTION SYSTEM

RELATED APPLICATION

This application is related to applications of the same inventor, U.S. Ser. No. 08/777,036, filed Dec. 30, 1996, now U.S. Pat. No. 5,839,848, issued Nov. 24, 1998, titled "Joining Metal Members".

BACKGROUND OF THE INVENTION

1. Field of the Invention

This invention relates to the profiles of roof truss chords used in a symmetrical light gauge steel pitched roof truss or a parallel open web joist. The profiles are particularly suited for attachment to web chords. The chord profiles can be connected to each other at the peak, ridge or valley in a manner that allows transfer of the compressive forces at the ridge 2. Description of Related Art Chord profiles of generally C-shape and U-shape suffer from the disadvantage that they lack structural rigidity, particularly where compressive force strength is needed. The problem is exaggerated with roof trusses where insufficient strength causes buckling to occur. Stiffening ribs help somewhat but by themselves do not provide sufficient strength. Some designs bend the outer lips of the chords outwards in an attempt to add some strength.

SUMMARY OF THE INVENTION

In the present invention the outer lips of the roof chords are bent in an inward direction. Bending the outer lips of the chord inward makes the chord stronger against buckling and balances the behavior of the chord profile in axial torsion. Because there are no sharp edges the chord is safer to handle. The present invention connects the chords to each other in a direct contact manner by positively locking the flanges and the closed end of the chord section with a special chord end piece.

DETAILED DESCRIPTION OF THE INVENTION

Figure 1:
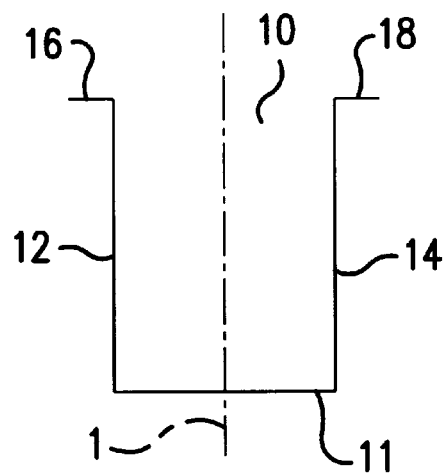
FIG. 1 is an end view of a prior art web having a U shape cross section with stiffening flanges.

Turning first to a general description of prior art roof trusses, FIG. 1 shows an end view of a generally U shaped chord member typically used for top chords in roof trusses. Parallel side legs 12, 14 join flat web 11, and stiffening flanges 16, 18 are bent outward, with respect to the centerline 1, at the mouth area 10.

Figure 2:
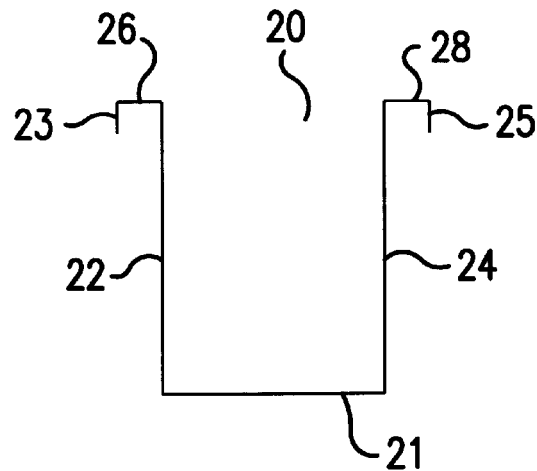
FIG. 2 is an end view of a prior art web similar to FIG. 1 adding metal bends.

Prior art FIG. 2 modifies the chord member of FIG. 1. Stiffening flanges 26, 28 are bent outward outward at the mouth area 20 in a direction normal to the planes of legs 22, 24. The edges of flanges 26, 28 are bent downward to form downwardly depending edges 23, 25.

Figure 3:
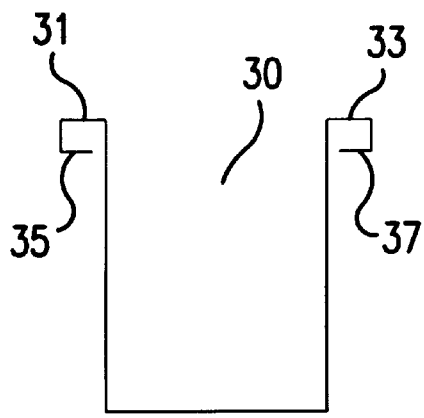
FIG. 3 is an end view of a prior art web similar to FIG. 2 with double thickness flanges.

Prior art FIG. 3 adds further strength to chords by bending stiffening flanges 35, 37 over flanges 31, 33, respectively, to form double thickness flanges.

Figure 4:
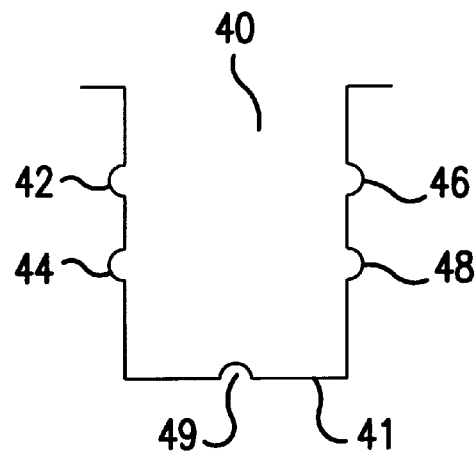
FIG. 4 is an end view of a prior art web similar to FIG. 1 with stiffening ribs.

Prior art FIG. 4 adds stiffening ribs 42, 44, 46, 48 which extend along the length of the legs. Optionally a rib 49 can be added extending along the length of web 41.

Each of these prior art chords when subjected to compressive force suffer from structural rigidity. While the outwardly depending flanges add strength to chords without such flanges the mouth areas designated 10, 20, 30 and 40 in FIGS. 1, 2, 3, 4, respectively are relatively weak because the outward orientation of the flanges weakens the chord in the mouth area.

Figure 5:
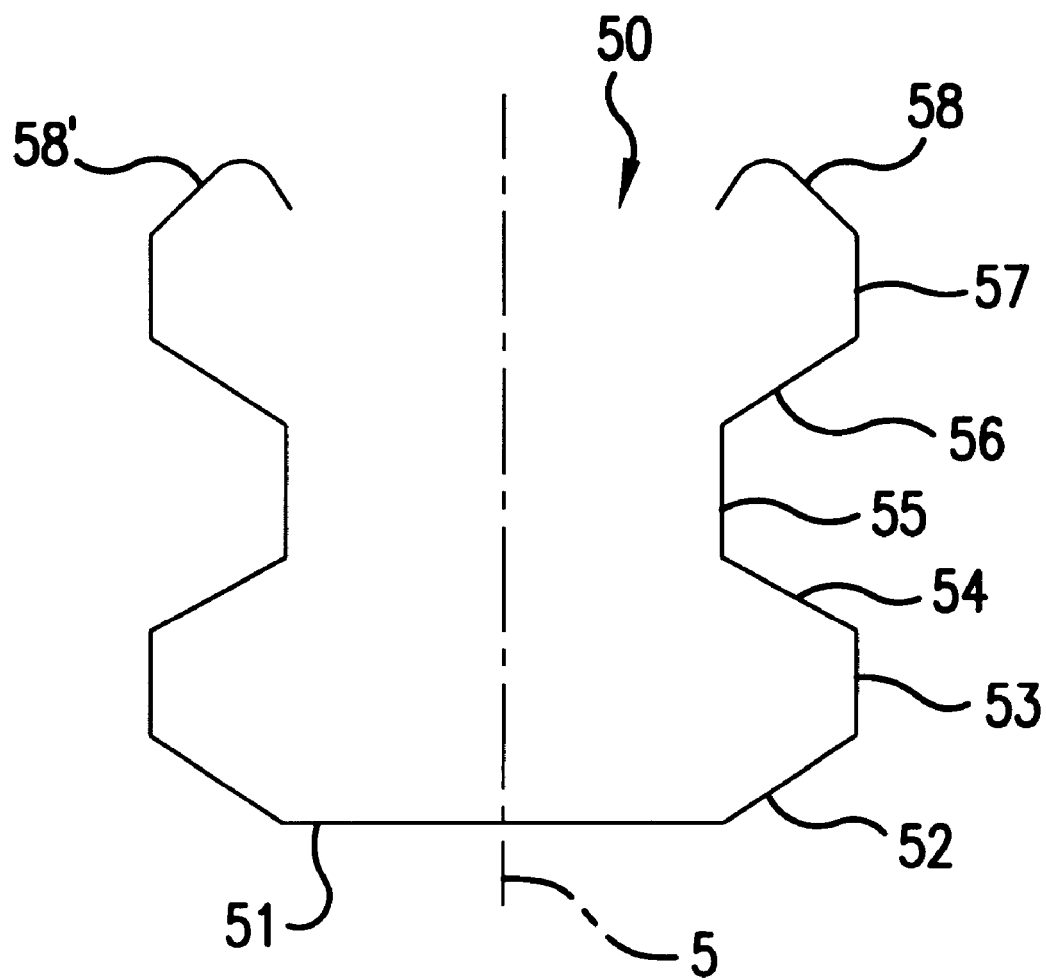
FIG. 5 is an end view of the inventive chord.

FIG. 5 is an end view of the inventive chord with a generally C shape profile. Viewing the right side of FIG. 5, joining web 51 is a series of flange portions 52 through 58. These flange portions form a trapezoidal center design. In a symmetrical manner joining web 51 the left side has corresponding flange portions and a trapezoidal center. The design also places the open ends of the mouth area 50, that is at the flange portions 58, 58', further from the center line 5, and the flange portions 58, 58' depend inwardly toward each other. The greater the amount of material, and the further from the center line, the stronger the chord shape is against bending. Additionally, the trapezoidal flange provides the chord with more balance and provides greater strength against axial torsion. Further, at the mouth end 50, bringing the ends of the trapezoidal shape inwardly toward each other strengthens the outmost edges. The web portion 51 may have an optional stiffening rib if desired.

The flange portions 52 through 58 will have particular lengths, and angles with respect to another portion, other than that shown. Thus, the figures are not meant to be limiting but only illustrative.

The mouth end has portions 58, 58' with a generally curved end. The invention is not limited to the details of these ends. The essential point is that the ends open toward the assembly, that is, towards the center line 5. The ends 58, 58' may have a slight curvature, as shown, or they may have a sharper corner with a downwardly depending portion, or they may have any other configuration as long as the mouth ends are brought inward.

Comparing the mouth area of the inventive chord to that of the prior art chords of FIGS. 1–4, the FIG. 5 profile shows that the mouth area is stronger than that of the prior art because the ends bend inwardly, the trapezoidal areas add strength because for a corresponding area more metal and material is present leading to increased strength, and the flange portions are further from the centerline 5.

The inwardly depending ends cannot be caught or hooked onto anything by accident and because there are no sharp edges the chords are safer to handle when lifted by hand.

Figure 6:
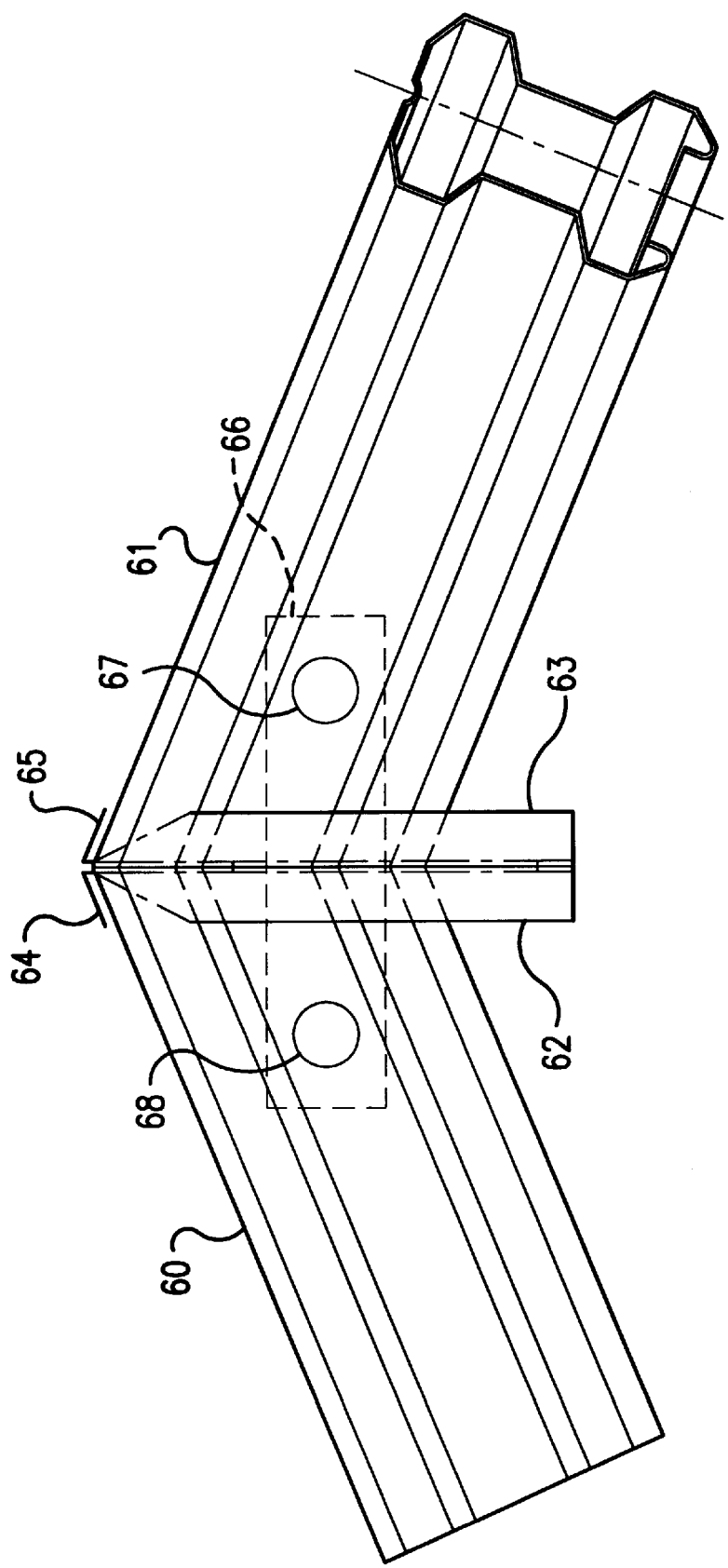
FIG. 6 is a partial perspective view of the chord is used as a top chord in a ridge connection.

FIG. 6 is a partial perspective view showing how the inventive chord is used as a top chord in a ridge connection. The top chords 60, 61 are miter cut at a suitable angle where they join each other and are constrained by a pair of plates 62, 63 having integral tops 64, 65, respectively. A connecting web 66 connects to each of the chords 60, 61 to hold the chords against movement, particularly from uneven loads against the roof of a structure.

The connecting web 66 may have areas such as 67, 68 where the connecting web may be joined or fastened to the chords in a manner taught by U.S. Pat. No. 5,839,848 titled "Joining Metal Members", which patent is incorporated by reference.

In the prior art chord profiles are connected at the top by self tapping screws or other fasteners, or a connector piece is used and the chord flanges are connected to this connector by screws, rivets, etc. The compressive forces are transferred through these fasteners. In the present invention because the chord ends are in direct contact they are able to absorb the compressive forces more favorably. The top chords may connect to other members and can carry possible tension forces at the ridge.

Figure 7:
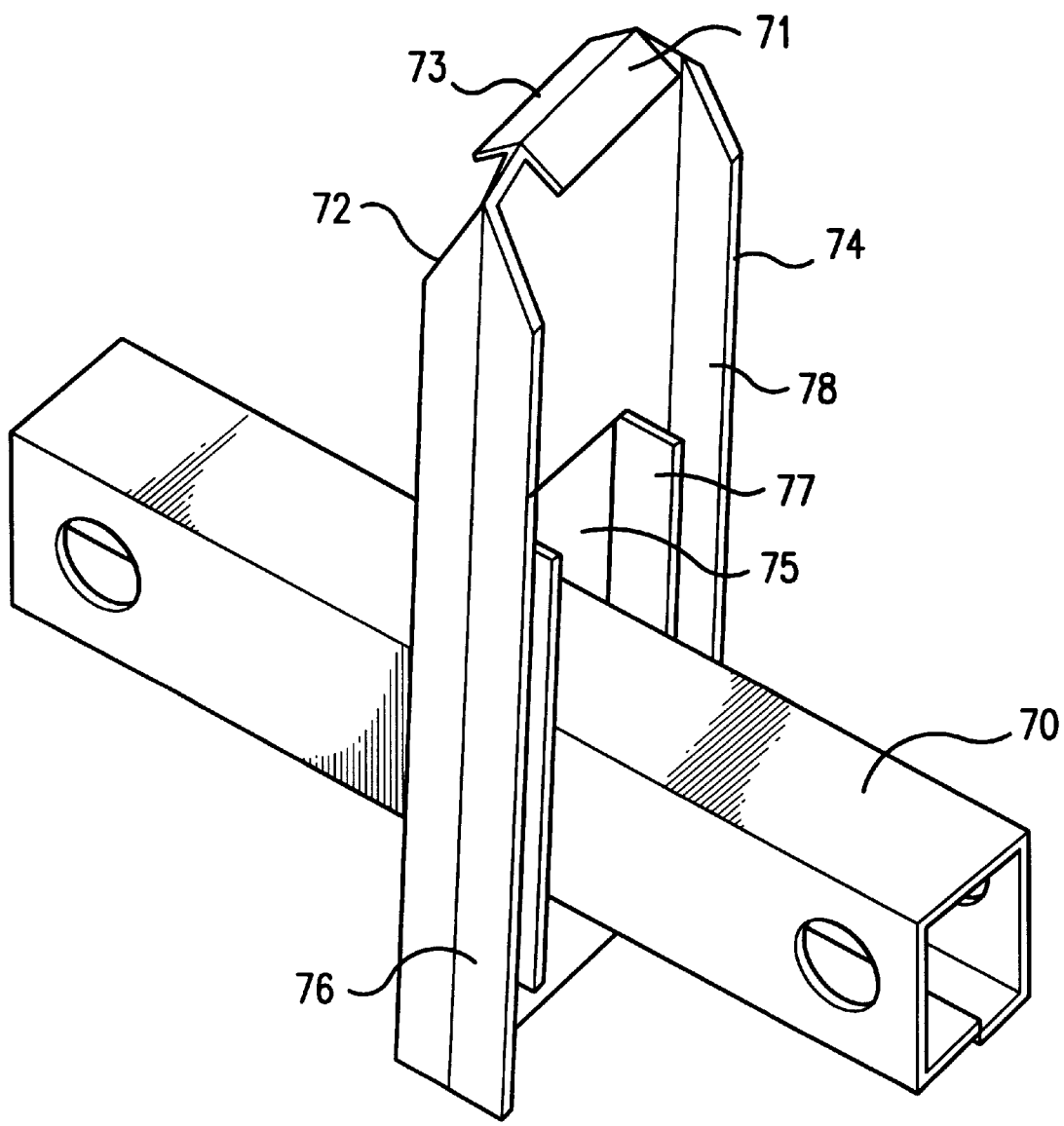
FIG. 7 is a perspective view of a truss ridge connecting web and a pair of ridge plates.

FIG. 7 is a perspective view of a connecting web and the pair of ridge plates. An opening 75 is formed in both of the plates 72, 74 of a size to permit penetration of the connecting web 70. The opening has side tabs such as 77. Plate 74 is shown with side tabs 76, 78. These tabs lock the connecting web and constrains the connecting web against movement. The tabs are integral with the plates. The tops of each plate have ridge tabs 71, 73 which serve to positively lock the top of the chord in place. The angle of the ridge tab depends, of course, on the particular angle the top chords take with respect to the bottom chord.

The drawings are illustrative only. No limitation is intended by the relative sizes of the chords, ridge plates, connecting web, or the sizes and angles of the trapezoidal areas, or the exact configuration of the inwardly depending mouth areas.

What is claimed is:

1. A metal building truss ridge connection comprising:
    two top chords, each top chord further comprising,
        a generally C shaped cross section having a mouth area at one end of the chord and a web at an opposite end of the chord;
        first and second trapezoidal flange portions on opposite sides of the web;
        each of said flange portions having terminating ends at said mouth area;
        said terminating ends depending inwardly toward each other,
    two ridge plates, each of said ridge plates having an opening, side tabs at the sides of said opening, and a ridge tab, said ridge tab at the top of each of said ridge plates; and
    a connecting web, said connecting web passing through said opening of each of ridge plates, said connecting web fastened to each of said top chords, said ridge tabs of each of ridge plates locking said top chords.

2. The metal building truss of claim 1 wherein said terminating ends have a slight curvature.

3. A metal building truss including a top chord comprising:
    said top chord having a mouth area at one end of the chord and a web at an opposite end of the chord, and a center line;
    said web lying in a first plane;
    first and second trapezoidal flange portions on opposite sides of said web extending from said web to said mouth area;
    each of said first and second trapezoidal flange portions comprising:
        a first flange portion having first and second ends;
        a second flange portion having third and fourth ends;
        a third flange portion having fifth and sixth ends;
        a fourth flange portion portion having seventh and eighth ends;
        a fifth flange portion having ninth and tenth ends;
        a sixth flange portion having eleventh and twelveth ends;
        a terminating portion having thirteenth and terminating ends;
        said first flange portion connected at said first end to said web and extending at a first angle away from said center line; said second end connected to said third end;
        said second flange portion lying in a plane which is at a right angles with respect to said first plane; said fourth end connected to said fifth end;
        said third flange portion extending at a second angle towards said center line; said sixth end connected to said seventh end;
        said fourth flange portion lying in a plane which is at a right angles with respect to said first plane, said eighth end connected to said ninth end;
        said fifth flange portion extending at a third angle away from said center line; said tenth end connected to said eleventh end;
        said sixth flange portion lying in a plane which is at a right angles with respect to said first plane, said twelveth end connected to said thirteenth end; and
    each of said trapezoidal flange portions ending in said terminating portion, having said terminating ends at said mouth area;
    whereby said second, fourth and sixth flange portions are parallel to each other, and said sixth, seventh, eighth, ninth and terminating ends all lie in the same plane.

4. The metal building truss of claim 3 wherein said first, sixth, seventh, eighth, ninth ends and terminating ends all lie in the same plane.

5. The metal building truss of claim 3 wherein said terminating ends have a slight curvature.

6. A metal building truss including a chord comprising:
    said chord having a mouth area at one end of the chord and a web at an opposite end of the chord, and a center line;
    said web lying in a first plane;
    first and second trapezoidal flange portions on opposite sides of said web extending from said web to said mouth area;
    each of said first and second trapezoidal flange portions comprising:
        a first flange portion having first and second ends;
        a second flange portion having third and fourth ends;
        a third flange portion having fifth and sixth ends;
        a fourth flange portion portion having seventh and eighth ends;
        a fifth flange portion having ninth and tenth ends;
        a sixth flange portion having eleventh and twelveth ends;
        a terminating portion having thirteenth and terminating ends;
        said first flange portion connected at said first end to said web and extending at a first angle away from said center line; said second end connected to said third end;
        said second flange portion lying in a plane which is at a right angles with respect to said first plane; said fourth end connected to said fifth end;
        said third flange portion extending at a second angle towards said center line; said sixth end connected to said seventh end;
        said fourth flange portion lying in a plane which is at a right angles with respect to said first plane, said eighth end connected to said ninth end;

said fifth flange portion extending at a third angle away from said center line; said tenth end connected to said eleventh end;

said sixth flange portion lying in a plane which is at a right angles with respect to said first plane, said twelveth end connected to said thirteenth end; and each of said trapezoidal flange portions ending in said terminating portion, having said terminating ends at said mouth area;

whereby said second, fourth and sixth flange portions are parallel to each other, and said sixth, seventh, eighth, ninth and terminating ends all lie in the same plane.

7. The metal building truss of claim 6 wherein said first, sixth, seventh, eighth, ninth and terminating ends all lie in the same plane.

8. The metal building truss of claim 6 wherein said terminating ends have a slight curvature.

* * * * *